United States Patent [19]

Förster

[11] Patent Number: 4,550,685
[45] Date of Patent: Nov. 5, 1985

[54] DEVICE FOR SUPPLYING FARM ANIMALS WITH A LIQUID FEED

[76] Inventor: Martin Förster, Gerwigstrasse 27, D 7707 Engen, Fed. Rep. of Germany

[21] Appl. No.: 609,095

[22] Filed: May 10, 1984

[30] Foreign Application Priority Data

Jan. 14, 1984 [DE] Fed. Rep. of Germany ....... 3401168

[51] Int. Cl.⁴ ............................................. A01K 9/00
[52] U.S. Cl. .................................................... 119/71
[58] Field of Search ............................... 119/71, 52 B

[56] References Cited

U.S. PATENT DOCUMENTS

| | | | |
|---|---|---|---|
| 3,164,128 | 1/1965 | Arledge | 119/52 B X |
| 3,204,607 | 9/1965 | Arnold et al. | 119/71 X |
| 3,628,506 | 12/1971 | Glasbergen | 119/71 |

*Primary Examiner*—Hugh R. Chamblee
*Attorney, Agent, or Firm*—McGlew and Tuttle

[57] ABSTRACT

A device for supplying farm animals with a liquid feed from an automatic feeding device comprises a flexible feed discharge line connected to the feed device and terminating in an animal operated discharge member or sucker. The sucker is supported by a member which is moved back and forth on a conveyor in the form of an overhead trolley. The liquid feed connecting line which connects the feeder is flexible and it is moved over a support which is advantageously on a level substantially equal to that of the feeder so that the connecting line is supported as the end thereof carrying the sucker is moved by the overlying conveyor. Because the sucker may be displaced into a plurality of different feeding stations in a controlled manner, feed can be supplied in a controlled manner and accurately metered in accordance with the feed to be given out at each station.

8 Claims, 2 Drawing Figures

4,550,685

DEVICE FOR SUPPLYING FARM ANIMALS WITH A LIQUID FEED

FIELD AND BACKGROUND OF THE INVENTION

This invention relates in general to animal feeders and in particular to a new and useful device for supplying liquid feed to animals from an automatic feeder and to a plurality of animal feeding stations.

Liquid devices for animals are known in a variety of designs and have proved satisfactory in practice. With a larger number of animals to be supplied with milk, it is further known to support the receptacle containing the milk on a structure which can travel on rails and to which a suction device is rigidly connected, and to move this structure to the individual stalls. The costs of such an arrangement are very high and require a great amount of power for displacing the heavy structure. The maintenance of such equipment which is susceptible to disturbances is also expensive since the rails laid on the floor of the animal housing are recurrently to be cleaned. Further, at every displacement, the milk in the receptacle is agitated, which is not favorable to its preservation. Nor is a controlled supply of amounts to individual animals possible.

SUMMARY OF THE INVENTION

The invention is directed to a liquid supply device permitting the supply of a large number of animals with always exactly metered amounts of liquid feed and which is inexpensive yet highly reliable in operation and easy to maintain and handle.

In accordance with the invention, the device for supplying farm animals with a liquid feed from an automatic feeder comprises a flexible feed discharge line which is connected to the feeder and terminates in an animal operated discharge such as a sucker. The sucker is supported on a member such as a plate and it is moved by an overhead trolley-like conveyor through a path intersecting a plurality of feeding stations. Advantageously, the sucker comprises a nipple which is exchangeably inserted in a support plate which is laterally displaceable in a guide rail of a conveyor trolley which also includes a lower guide rail over which the plate is movable. The construction advantageously includes a yoke which is connected to the support plate which is rotatably supported on rollers and the plate itself is mounted for sliding displacement or guided displacement on a guide rail having slide surfaces.

In accordance with a feature of the invention, a flexible connecting line is supported at a level above the floor extending substantially parallel to the trolley conveyor. The supporting surface is advantageously below the liquid level of the mixer or the automatic feeder. It is also advantageous that the automatic feeder is disposed about intermediate the height between the guide rails of the overhead conveyor. The moving element of the conveyor advantageously comprises a chain or belt which is trained around a guide roller on a rack and pinion or friction wheel mechanism which is drivable in both directions by means of a motor which is advantageously designed as a stepping motor. The construction advantageously includes an identification unit which is provided on the support plate for the sucker and which is connected for a programmable control of the automatic feeder so that the feeder will deliver the type and quantity of feed desired at each station. Advantageously, one or more control marks are provided along the guide rails for the conveyor and a proximity switch is provided on each station which in engaged by the displaceable sucker.

The inventive device is very simple in construction and thus inexpensive in manufacture, and extraordinarily reliable in operation while at the same time permitting a controlled feed of great number of animals. A horizontally displaceable sucker or suction device connected through a flexible tube to a stationary automatic feeder, requires only a few constructional parts and a small power, since only the sucker itself and the tube are displaced. Moreover, the rails for the displacement extend above the floor of the stable or barn, so that they cannot be easily soiled, which substantially reduces the cost of attendance.

The primary advantage, however, is that with a programmable automatic feeder, the animals can be supplied individually with respective apportioned amounts of feed. For example, one certain group of animals can be supplied constantly with the same amount, or certain individual animals identified by the identification unit are supplied with predetermined amounts of feed to be taken off by suction. The feeding is thus well controlled.

Accordingly it is an object of the invention to provide an improved liquid feeder which makes it possible to effect feeding at a plurality of stations through a connection from a flexible line to an automatic feeding mechanism.

A further object of the invention is to provide an automatic feeder for liquid feed for animals which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
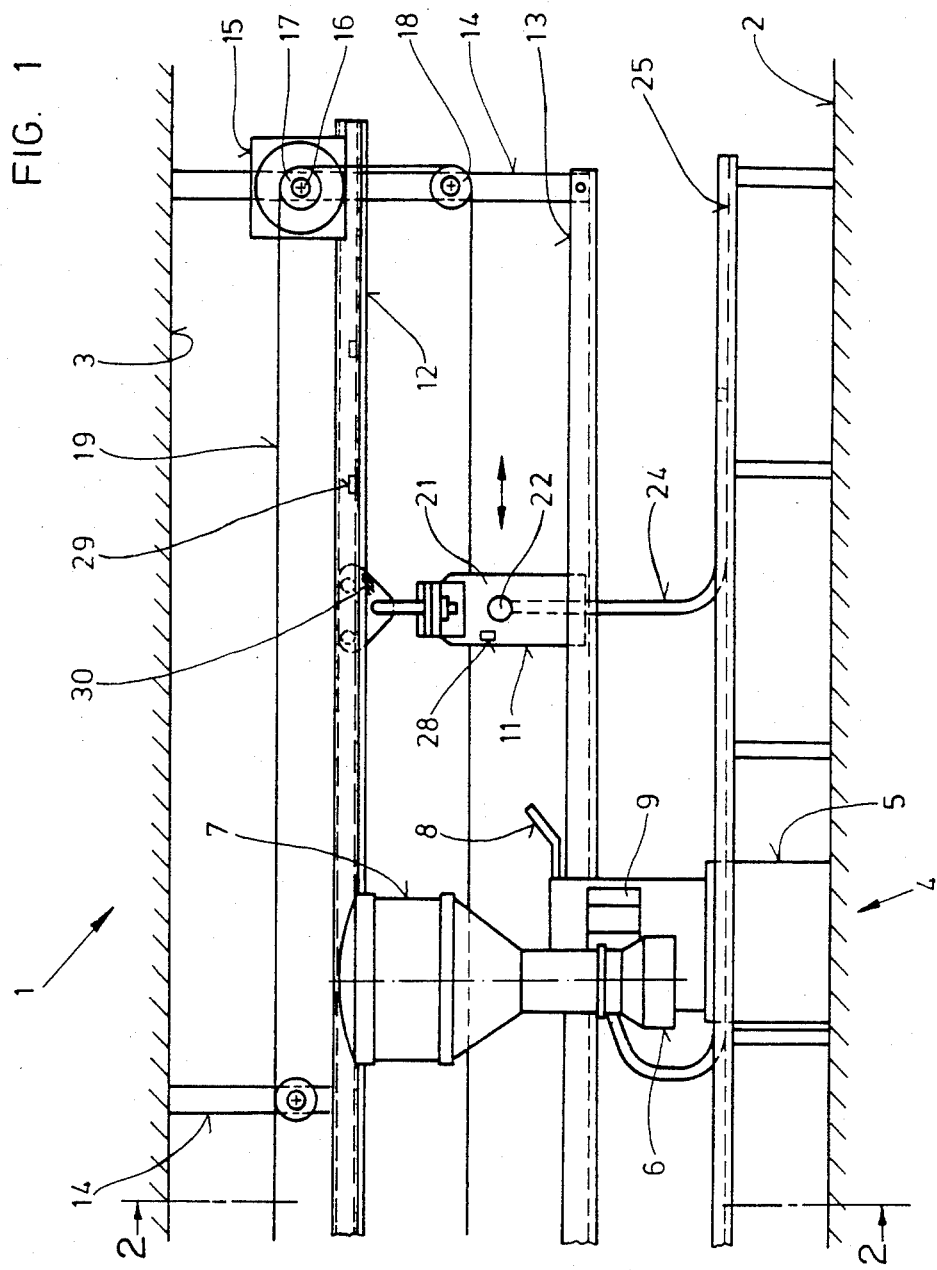
FIG. 1 is a side elevational view of a feeder constructed in accordance with the invention.

Referring to the drawings in particular the invention embodied therein comprises a device for supplying farm animals with a liquid feed from an automatic feeder 4 which comprises a flexible feed discharge line 24 connected to the feeder 4 and terminating in an animal operated discharge or sucker 22. A member such as a plate 21 carries the discharge sucker 22 and conveyor means in the form of an endless cable 19 driven by a motor 15 over a drive pulley 17 which effects the movement of the plate member 21 with the sucker while it remains connected with the flexible connecting line 24 so that it may be indexed through a plurality of feeding stations at selected locations away from the feeder 4.

Figure 2:
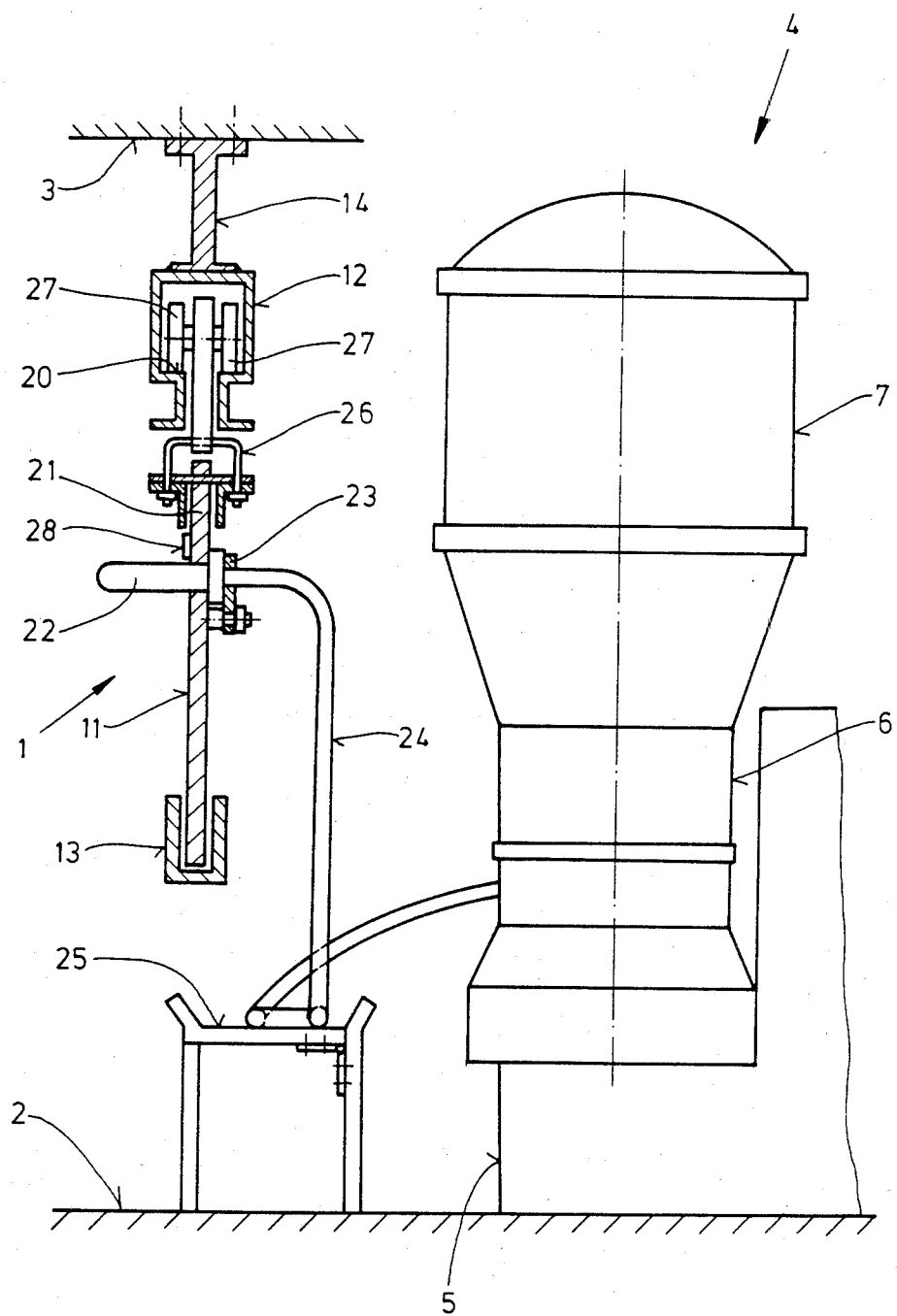
FIG. 2 is a section taken along the line 2—2 of the feeder shown in FIG. 1 on an enlarged scale.

The device shown in FIGS. 1 and 2 and generally designated 1 serves the purpose of supplying a large number of animals in a controlled manner with a liquid feed. The device includes substantially a stationary automatic feeder 4 and a suction device or sucker 11 which is displaceable transversely relative to the feeder. The feeder 4 comprises a housing 5 placed on the floor 2 of the stable, a mixer 6 supported by the housing, and a supply vessel 7 in which the dry powdery ingredient of the feed is received. The dry powder and water added through a line 8 are introduced into mixer 6 where the liquid feed is prepared to be supplied to sucker 11 for the animals.

In the shown embodiment, the displaceable sucker 11 comprises a plate 21, and a nipple 22 which is fixed therein on a clamp 23 and connected, through a flexible tube 24, to a mixer 6 of feeder 4. Plate 21 is retained by, and displaceable on, an upper guide rail 12 and a lower guide rail 3. The two rails 12 and 13 are channel sections which are suspended from hangers 14 from roof 3 of the stable. To minimize friction, the plate 21 is supported through a yoke 26 by rollers 37 which travel on slide surfaces 20 of the upper guide rail 12.

Sucker 11 is moved by an endless rope 19 or conveyor trained around rollers 18 driven by a motor 15 having a drive pulley 17 secured to its output shaft 16. By designing the motor as a stepping motor, and providing control marks 29 on the upper rim 12, for example, the sucker provided with a proximity switch can be indexed into each operative station. Further provided on plate 21 may be an identification unit 28 cooperating with a programmable control 9 associated with automatic feeder 4, so that animals equipped with an identification mark can be supplied with a corresponding amount of feed.

Since automatic feeder 4 is set up about at the middle of rails 12 and 13, flexible tube 24 which rests on a trough-like support 25 extending below the lower liquid level of mixer 6, need have only half the length of rails 12,13 to reach any location whither sucker 11 can travel. The cooling of the warmed up feed in tube 24 is therefore negligible and the animals supplied through tube 24 need produce only a small sucking power. Along with a simple handling, the inventive device reliably ensures a controlled supply of liquid feed prepared in the automatic feeder to a large number of animals.

While specific embodiments of the invention have been shown and described in detail to illustrate the application of the principles of the invention, it will be understood that the invention may be embodied otherwise without departing from such principles.

What is claimed is:

1. A device for supplying farm animals with a liquid feed, comprising, a fixed automatic feeder a flexible feed discharge line connected to said feeder and terminating in an animal operated discharge, a member carrying said animal operated discharge, and conveying means connected to said member for moving said member with said flexible line connected thereto through a plurality of feeding stations, said animal operated discharge member comprises a sucker which is moved with said flexible connecting line through a horizontal path, said sucker comprising a nipple exchangeably inserted in said member, said member comprising a plate, said conveyor means comprising an upper guide rail and a lower guide rail, said plate being displaceable between said upper and lower guide rail, said lower guide rail having a channeled cross section into which said plate extends.

2. A device according to claim 1, including a yoke connected to said plate and having rotatable supporting rollers mounted for displacement on said upper guide rail, said upper guide rail having a slide surface over which said rollers engage.

3. A device according to claim 1, wherein said conveyor means includes a chain connected to said member carrying said discharge, guide roller means around which said chain extends and motor means for driving said chain in the selected direction.

4. A device according to claim 3, including an identification member associated with said animal operated discharge member and a programmable control associated with said fixed feeder for responding to said identification unit to provide a selected feed to said animal operated discharge.

5. A device for supplying feed animals positioned at a plurality of feeding stations along a horizontal path and on a floor, comprising:
an automatic feeder positioned at a fixed location with respect to the path and on the floor, said feeder including a supply vessel for containing a supply a of liquid feed, a mixer for mixing the supply of liquid feed and programmable control means for metering out quantities of the liquid feed;
overhead conveyor means including a guide disposed along the path and above the floor;
a plate member engaged with said guide and movable along said guide past the feeding stations;
a feeding nipple connected to said plate member for feeding each animal along the path;
said conveyor means including a drive connected to said plate member for moving said plate member along said path on said guide;
a trough-like support extending along the path above the floor; and
a flexible tube connected between said automatic feeder and said nipple for supplying liquid feed from said automatic feeder to said nipple, said flexible tube at least partly lying in and being supported by said trough-like support, said trough-like support being below said automatic feeder and said nipple.

6. A device according to claim 5, wherein said drive comprises a motor connected to said guide, a plurality of rollers connected to said guide and an endless rope entrained on said rollers and connected to said plate member for moving said plate member with actuation of said motor.

7. A device according to claim 6, wherein said guide includes an upper and a lower guide rod, said plate member being guided for movement in said lower guide rod and roller support means engaged in said upper guide rod and connected to said plate for movement of said plate along said path.

8. A device according to claim 7, wherein said automatic feeder is positioned at a level substantially between said upper and lower guide rods.

* * * * *